United States Patent

Allagnat et al.

[11] Patent Number: 5,971,162
[45] Date of Patent: *Oct. 26, 1999

[54] DEVICE FOR MANUALLY SORTING WASTE

[75] Inventors: Bernard Allagnat, Apremont; Marc Bodinier, Chamberry, both of France

[73] Assignee: AKROS Société à responsabilité limité, Chambery, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,746
[22] PCT Filed: Sep. 18, 1995
[86] PCT No.: PCT/FR95/01193
  § 371 Date: Mar. 17, 1997
  § 102(e) Date: Mar. 17, 1997
[87] PCT Pub. No.: WO96/09127
  PCT Pub. Date: Mar. 28, 1996

[30] Foreign Application Priority Data

Sep. 19, 1994 [FR] France .................................. 94 11288

[51] Int. Cl.⁶ ........................................................ B07C 7/04
[52] U.S. Cl. ........................... 209/705; 209/630; 209/919; 209/930
[58] Field of Search ...................................... 209/702, 703, 209/704, 705, 930, 630, 919

[56] References Cited

U.S. PATENT DOCUMENTS 2,842,265  7/1958  Bozeman et al. ........................ 209/704
3,707,228  12/1972  Conrad ..................................... 209/704

FOREIGN PATENT DOCUMENTS 0123825  11/1984  European Pat. Off. .
3410901  10/1985  Germany .
566183   5/1944   United Kingdom .
855816   12/1960  United Kingdom ................... 209/704

Primary Examiner—Tuan N. Nguyen
Attorney, Agent, or Firm—William H. Eilberg

[57] ABSTRACT

A device including an annular rotary tray (1) surrounding a central space (4) housing a waste infeed and discharge assembly (14). An adjustable flap (10) selectively urges the waste on the rotary tray (1) towards the edge or the center thereof. A loading belt (6) delivers the waste onto the rotary tray (1). As the rotary tray (1) rotates in one direction, the adjustable flap (10) gradually urges the waste towards personnel located at the periphery of the tray or towards a discharge chute. When the rotary tray (1) is rotated in the opposite direction, said adjustable flap (10) returns uncollected waste to the central space (4) for discharge.

15 Claims, 6 Drawing Sheets

DEVICE FOR MANUALLY SORTING WASTE

TECHNICAL FIELD OF THE INVENTION

The present invention concerns the sorting of solid products, for example ordinary domestic or industrial waste, in order to select waste that can be recycled economically.

The waste to be sorted may comprise all forms of articles made from paper, plastics material, glass, metal, wood or any other material. Sorting separates the waste articles according to their nature or their composition, to enable subsequent selective processing.

Methods and installations for sorting waste are already known, for example the method and device described in document U.S. Pat. No. 5,249,690. In this document, an installation for sorting waste comprises at least one generally linear main conveyor, associated with a linear return conveyor to form a closed loop, and with secondary conveyors and auxiliary conveyors linked to the main conveyor by manual sorting stations. An installation of this kind is particularly complex, requiring a multiplicity of conveyors, and takes up a great deal of room, divided between several floors of a building, and its cost is high.

There are also known, from documents GB-A-566 183 or EP-A-0 123 825, devices for manually sorting waste in which the presentation system is a horizontal annular turntable, with a fixed oblique flap diverting the waste radially at the end of the sorting area. The width of the annulus is limited, to enable the operative to reach the waste that it carries.

Document DE-A-34 10 901 describes a rotary table for automatic sorting of articles, with two-position flaps selectively ejecting articles to respective receptacles at the periphery. There is no provision for access to the articles by manual sorting operatives.

SUMMARY OF THE INVENTION

The problem to which the present invention is addressed is that of designing a new manual sorting device, and an associated method of using it, providing good access to the waste to enhance the quality of manual sorting by one or more operatives, and to reduce significantly the overall size of the sorting installation, combined with the provision to receive the contents of a garbage truck.

Another object of the invention is to make a sorting device more flexible in use, by enabling a variable number of operatives not dedicated to sorting a single category of objects to use the same device.

Another object of the invention is to enhance the quality of sorting, by facilitating exhaustive sorting of the content of the waste to be sorted that can be recycled economically.

To achieve the above and other objects, a device for manually sorting waste comprises at least one operative station at the periphery of a closed loop presentation system, with means for introducing the waste to be sorted onto the presentation system. Furthermore, in accordance with the invention:

the presentation system is a horizontal and generally annular rotary tray, delimited by an outside edge and by an inside edge, and rotated about a coaxial vertical axis by drive means, the inside edge surrounds a central space, waste infeed and discharge means are disposed near at least one of the inside and outside edges, adjustable pushing means push the waste on the rotary tray selectively and adjustably in the radial direction at least towards the outside edge, to move it selectively towards the outside edge and to make it accessible by the operative occupying the operative station, the adjustable pushing means selectively push the waste on the rotary tray radially and progressively to at least one of the inside and outside edges, and tip it onto the waste infeed and discharge means, the operative station comprises at least one structure for infeed and discharge of selected waste shaped and disposed for infeed and discharge of waste selected by the operative occupying the operative station.

Because of the pushing means, the rotary tray can have a relatively large width, greater than that enabling an operative to reach all of the waste passing in front of him on the rotary tray. The waste can be progressively pushed radially towards the outside edge of the rotary tray by the pushing means, until they are within reach of the operative.

In an advantageous embodiment, the adjustable pushing means comprise at least a first adjustable flap, in a fixed area above the rotary tray, and adapted to scrape the waste carried by the rotary tray and to divert it radially at least towards the outside edge, with means for actuating the first adjustable flap to control its orientation and the resulting diversion of the waste, possibly until they are selectively tipped at the periphery of the tray into waste infeed and discharge means.

Also in an advantageous embodiment, the adjustable pushing means comprise possibly at least a second adjustable flap, in a fixed area above the rotary tray and adapted to scrape the waste carried by the rotary tray and to divert it radially to the inside edge, with means for actuating the second adjustable flap to control its orientation and the resulting diversion of the waste. The second adjustable flap then selectively tips the waste into waste infeed and discharge means accommodated in the central space.

An advantageous possibility is to combine the first flap and the second flap in a single adjustable flap.

In a method in accordance with the invention of sorting waste, the waste is delivered onto a closed loop presentation system to pass near at least one operative station occupied by an operative responsible for manual sorting. The presentation system is a horizontal and generally annular rotary tray. In an initial sorting step, the waste on the rotary tray is progressively pushed towards the periphery of the rotary tray to move it towards the operative who removes selected waste from the rotary tray. During a final step, the waste that has not been selected is pushed either towards the centre, where it is tipped into the central space of the rotary tray, whence it is subsequently removed, or towards the periphery of the rotary tray towards a tipper chute whence it is subsequently removed.

BRIEF DESCRIPTION OF THE DRAWINGS

Other objects, features and advantages of the present invention will emerge from the following description of particular embodiments, given with reference to the accompanying drawings, in which.

DESCRIPTION OF THE PREFERRED EMBODIMENTS

In the embodiment shown in FIGS. 1 through 5, the device in accordance with the invention for manual sorting of waste comprises a horizontal and generally annular rotary tray 1 delimited by an outside edge 2 and an inside edge 3. The inside edge 3 surrounds a central space 4 which can accommodate waste infeed and discharge means described hereinafter.

Figure 1:
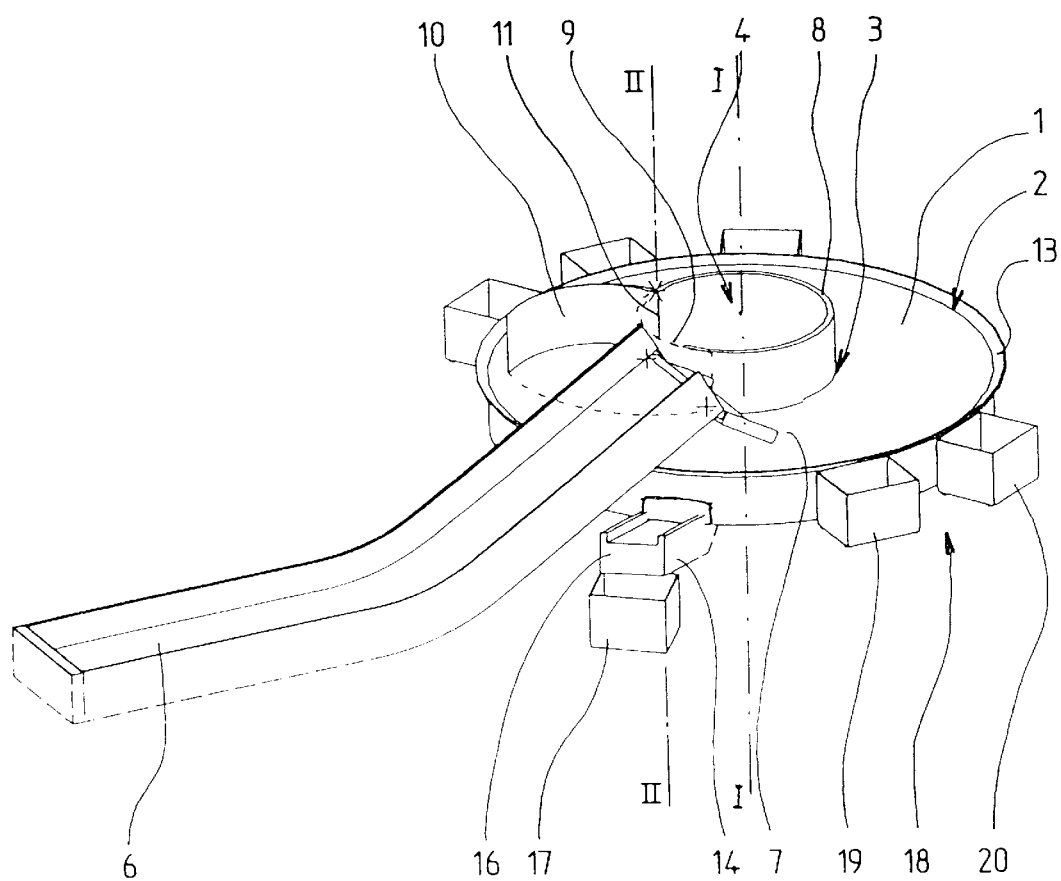
FIG. 1 is a diagrammatic perspective view of a first embodiment of a device in accordance with the present invention for sorting waste.
Figure 2:
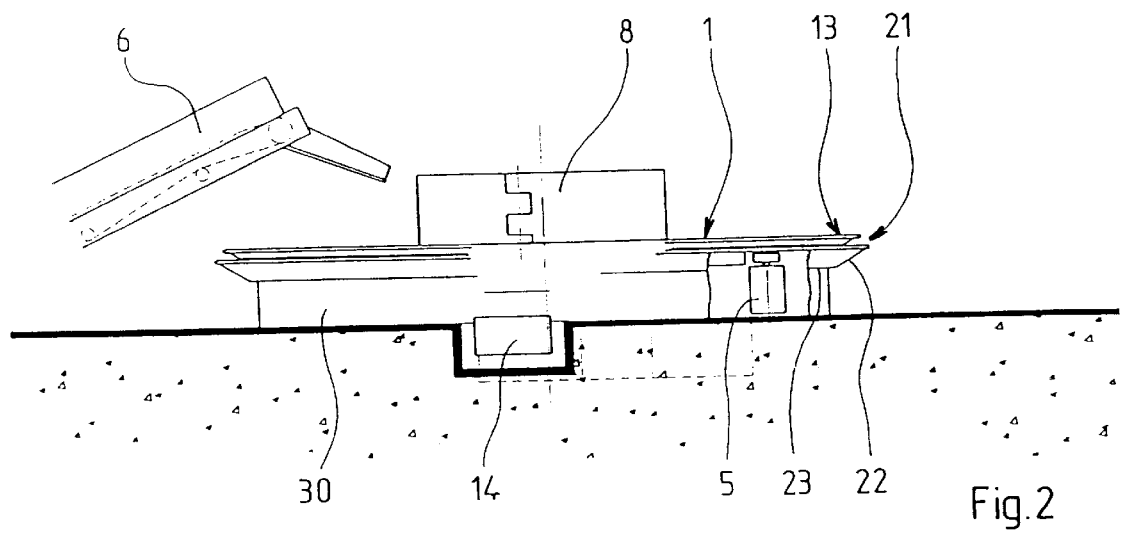
FIG. 2 is a lateral view in section of the sorting device from FIG. 1.
Figure 6:
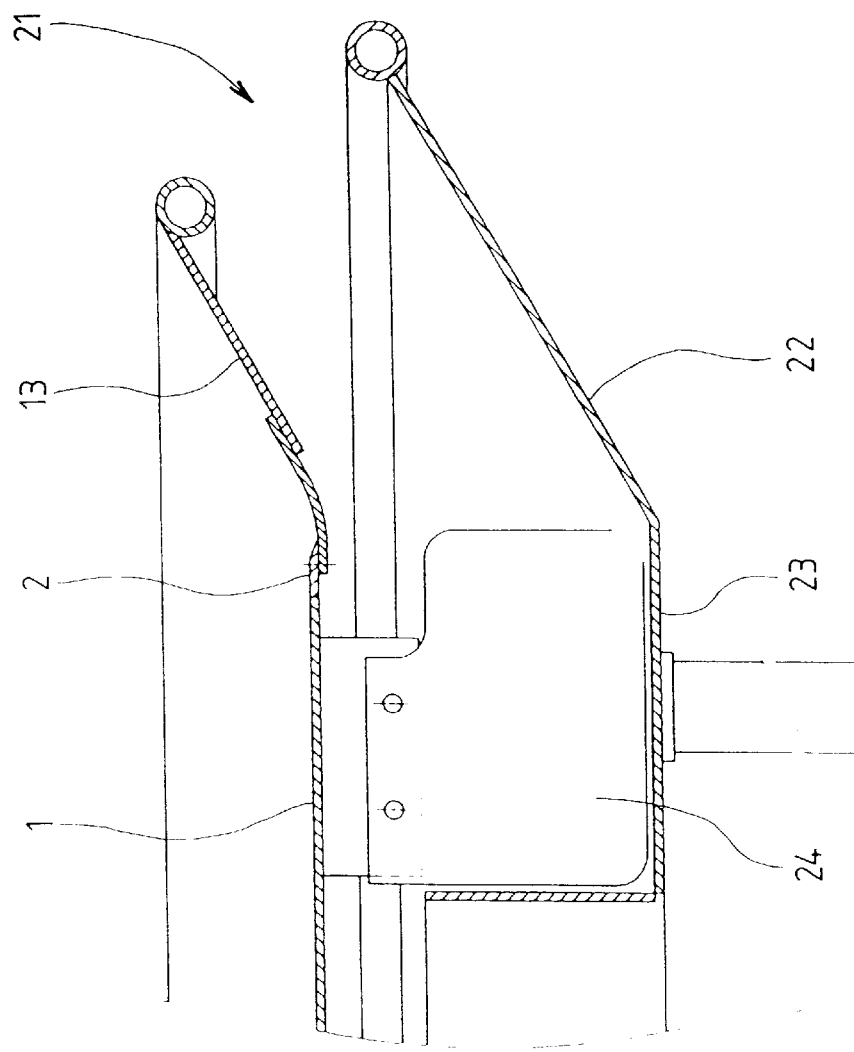
FIG. 6 is a fragmentary side view in diametral section and to a larger scale of the peripheral area of the device from FIG. 1.

The rotary tray 1 is supported by a frame 30 (FIGS. 2 and 6) and is rotated about a coaxial vertical axis I—I by drive means including a motor 5 and an appropriate transmission, as shown in FIG. 2. The motor 5 can preferably drive the rotary tray 1 in either rotation direction 26 or 27 shown in FIG. 3. The rotation direction is chosen by an operative.

A loading belt 6 delivers the waste to be sorted onto the rotary tray 1. The loading belt 6 may advantageously be upwardly inclined, to feed the waste from ground level above the level of the rotary tray 1 and then tip it onto the rotary tray 1 in a loading area 7.

The inside edge 3 of the rotary tray 1 is surmounted by a coaxial and generally cylindrical inside wall 8, that can advantageously be provided with an opening 9 that can be closed off by an adjustable flap 10.

In this embodiment shown, the adjustable flap 10 is curved in the shape of a cylindrical arc, and one of its vertical edges 11 is hinged about a vertical rotation axis II—II. The vertical rotation axis II—II is preferably a generatrix of the cylinder forming the inside wall 8, and therefore located in the vicinity of the inside edge 3 of the rotary tray 1. The flap 10 can be adjusted to any intermediate position between a folded position shown in FIGS. 3 and 4, in which it closes the opening 9 in the inside wall 8, and a deployed position shown in FIG. 5 and in dashed line in FIG. 3, in which it is pivoted away from the opening 9 and over the rotary tray 1. This places the adjustable flap 10 in a fixed area above the rotary tray 1, and the flap is adapted to scrape the waste carried by the rotary tray 1 so as to divert it selectively either radially towards the outside edge 2, or radially towards the inside edge 3, according to the direction of rotation of the rotary tray 1.

Actuator means such as a ram 12, advantageously disposed in the central space 4, adjustably orient the adjustable flap 10 in all intermediate positions between the folded position and the deployed position, and thereby control the resulting diversion of the waste carried by the rotary tray 1.

Figure 3:
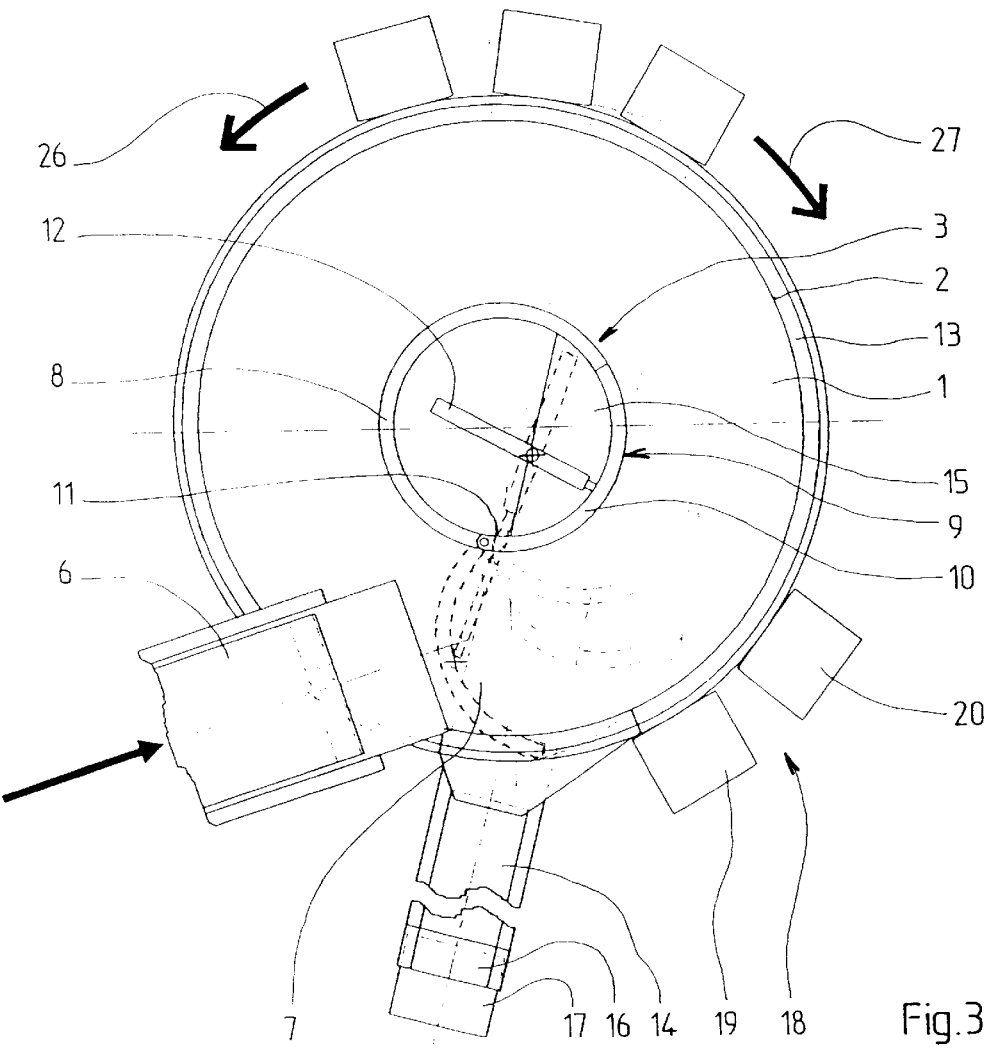
FIG. 3 is a plan view of the sorting device from FIG. 1.
Figure 4:
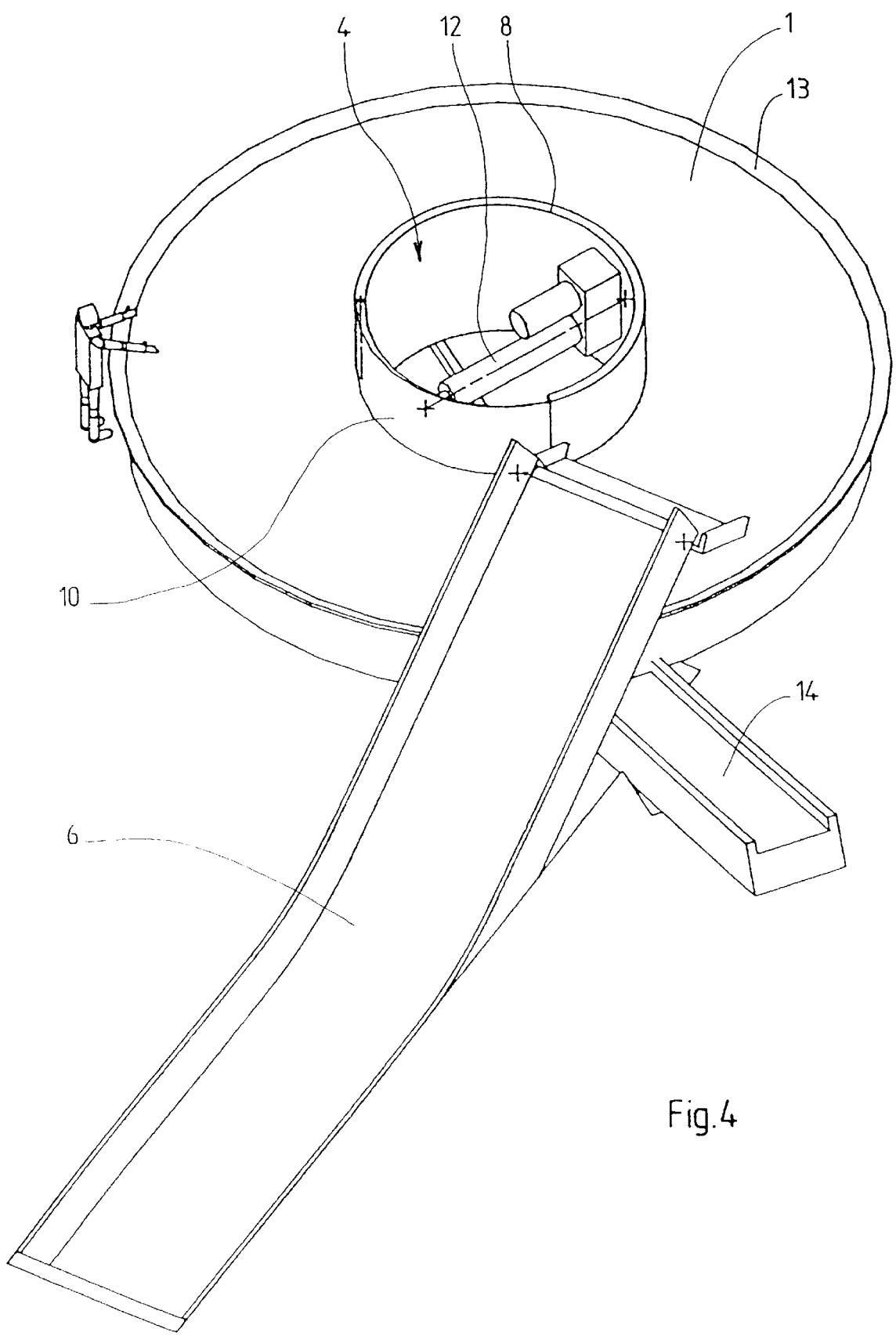
FIG. 4 shows the sorting device from FIG. 1 in perspective with the adjustable flap in the closed position for charging.
Figure 5:
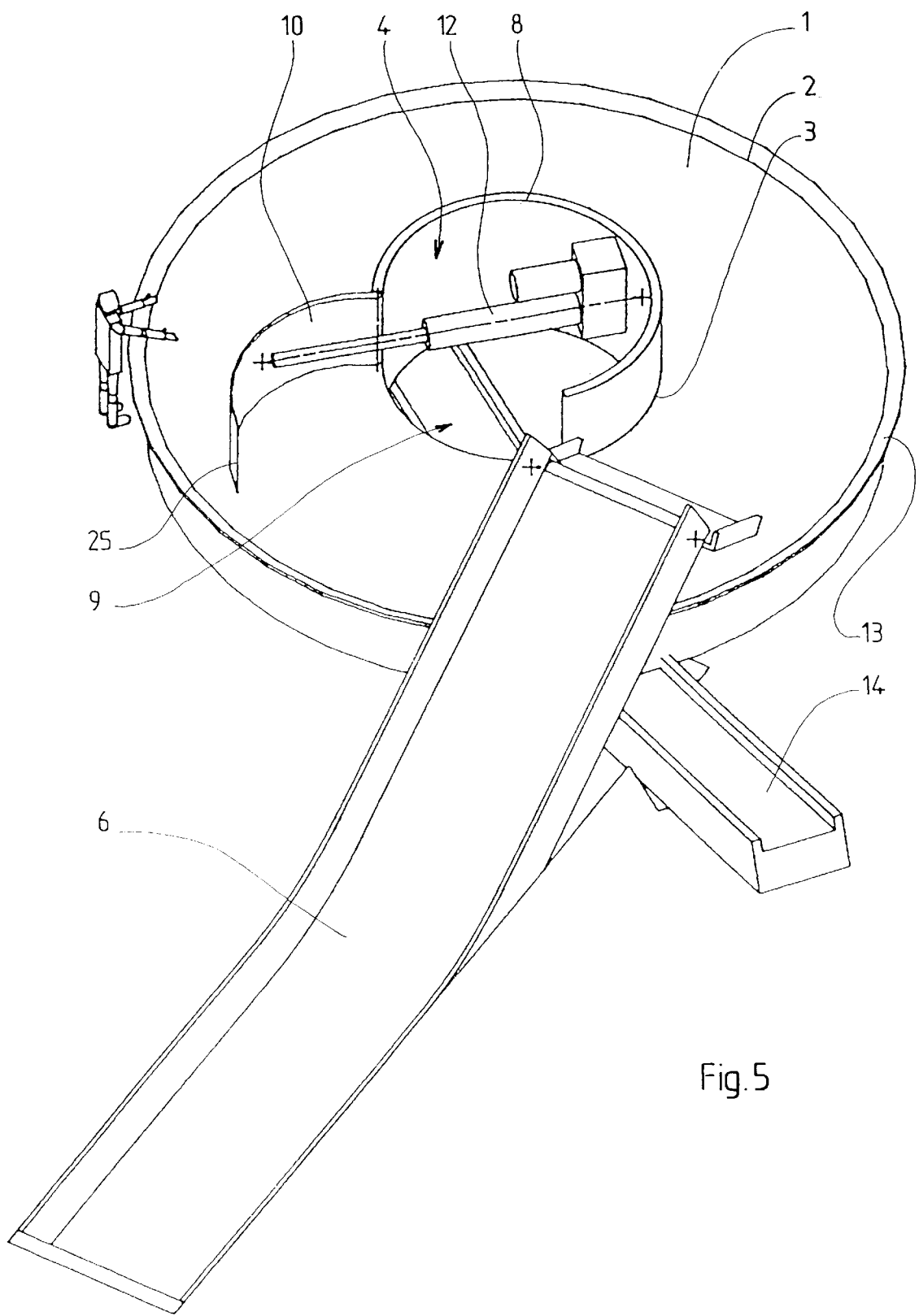
FIG. 5 shows the sorting device from FIG. 1 in perspective with the adjustable flap open to divert waste

In the folded position as shown in FIGS. 3 and 4, the adjustable flap 10 enables complete loading of the rotary tray 1. In the deployed position shown in FIG. 5, the adjustable flap 10 diverts the waste resting on the rotary tray 1 radially as said rotary tray 1 rotates.

The outside edge 2 of the rotary tray 1 is advantageously surrounded by a fixed raised peripheral portion 13, preventing unintentional escape of the wastes from the periphery of the rotary tray 1, and constituting a fixed support for the operative(s) to lean against. Thus, the peripheral portion 13 is attached to the frame 30 on which the rotary tray 1 turns.

The waste infeed and discharge means in the central space 4 comprise a linear discharge conveyor 14 for example, a portion 15 of which runs under the central space 4, and which conveys the waste collected in the central space 4 to an exit 16 at which it is tipped in a hopper 17, for example. In the central space 4, the waste can advantageously be guided by inclined panels, not shown, to the part 15 of the discharge belt 14.

There is at least one operative station 18 at the periphery of the rotary tray 1. The operative station 18 comprises at least one structure for infeed and discharge of selected waste, shaped and disposed for infeed and discharge of waste selected by the operative. In the figures, the operative station 18 is associated with two structures 19 and 20 for infeed and discharge of selected waste. These are interchangeable hoppers, for example, which are removed when they are full.

The figures show another embodiment of a structure of this kind for infeed and discharge of selected waste. This structure is shown particularly clearly in FIGS. 2 and 6: there is at least one bottom peripheral opening 21, arranged under the fixed peripheral portion 13, and linked by an inclined ramp 22 to means for discharging the selected waste. In the embodiment shown, the inclined ramp 22 conveys the selected waste to a coaxial fixed bottom tray 23 associated with a scraper 24 driven by the rotary tray 1 to push the selected waste to at least one exit in the fixed bottom tray 23 in order to discharge it.

The rotary tray 1 is preferably of a size adapted to receive a volume of waste corresponding to the content of a garbage truck for collecting domestic or industrial waste. For example, the rotary tray 1 may advantageously have an outside diameter of about 8 meters, with the central space 4 having a diameter of about 3 meters. The inside wall 8 may advantageously have a height of 80 to 100 centimeters. The size of the adjustable flap 10 is advantageously such that, in the open position shown in FIG. 5, its free edge 25 is near the outside edge 2 of the rotary tray 1.

A manual sorting device of the above kind operates in the following manner. Initially, the adjustable flap 10 is in the closed position as shown in FIG. 4. The rotary tray 1 is rotated in the sorting direction 26, and the loading belt 6 conveys the waste to be sorted and tips it onto the rotary tray 1 in the loading area 7. The waste piles up on the rotary tray 1, to an appropriate height less than the height of the inside wall 8. The operative(s) disposed around the rotary tray 1 can then begin the sorting operation by selecting certain types of waste in the accessible waste area near the outside edge 2, transferring it by hand into the structures for infeed and discharge of selected waste such as the hoppers 19 or 20 or into the opening 21. As sorting proceeds, the height of the waste on the rotary tray 1 tends to decrease. The adjustable flap 10 is then actuated, in order to open it partially, with the rotary tray 1 turning in the sorting direction shown by the arrow 26 in FIG. 3. With this rotation direction, the adjustable flap 10 diverts the waste carried by the rotary tray 1 towards the outside edge 2, and therefore moves it towards the operative(s), who can then reach it to continue manual sorting. The manual sorting operation may be continued, by rotation of the rotary tray 1, until the selection of the chosen types of waste has been completed.

At the end of sorting, for example when all the bulky waste and the waste that can be recycled economically has been selected and removed from the rotary tray 1, the products remaining on the tray are discharged. A first option is to reverse the rotation of the rotary tray 1, so that it rotates in the discharge direction shown by the arrow 27 in FIG. 3, and to open the adjustable flap 10 completely to the open position shown in FIG. 5 or in dashed line in FIG. 3. In this position of the adjustable flap 10 and with this rotation direction 27 of the rotary tray 1, unselected waste still on the rotary tray 1 is diverted by the adjustable flap 10 towards the inside edge 3, and passes through the opening 9 in the inside wall 8 into the central space 4 where it is tipped onto the discharge belt 14.

Figure 7:
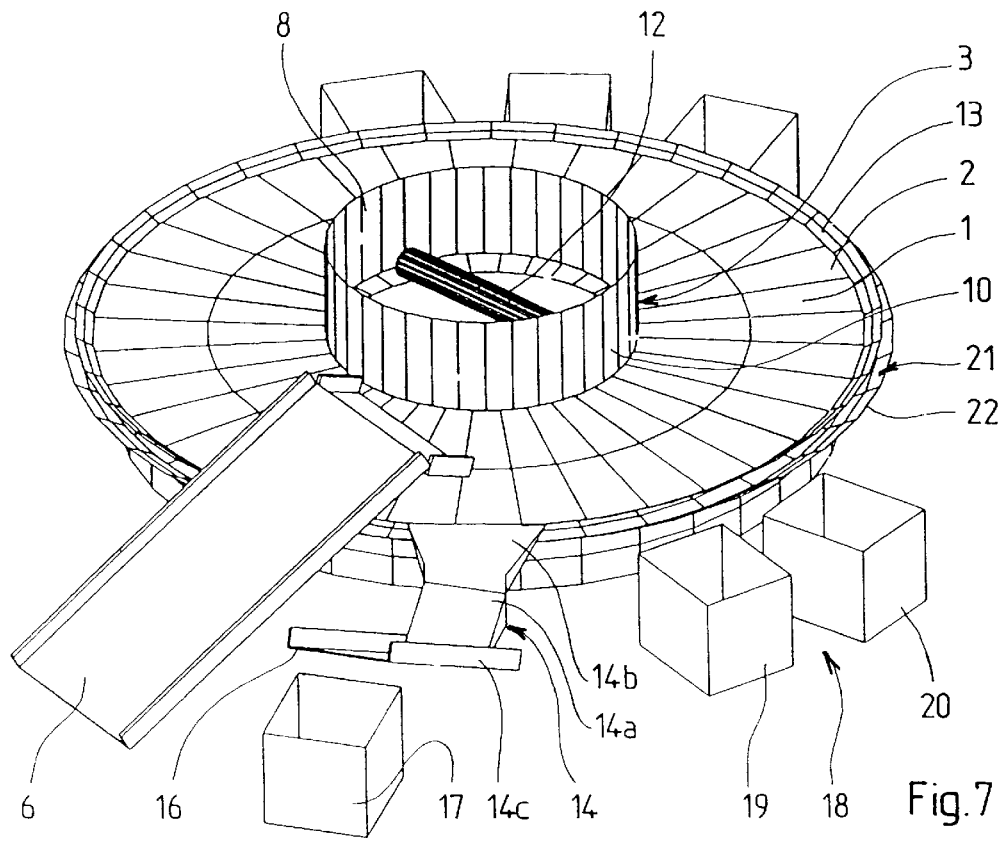
FIG. 7 shows a second embodiment of a device in accordance with the invention for sorting waste in perspective, with the adjustable flap in the closed position.
Figure 8:
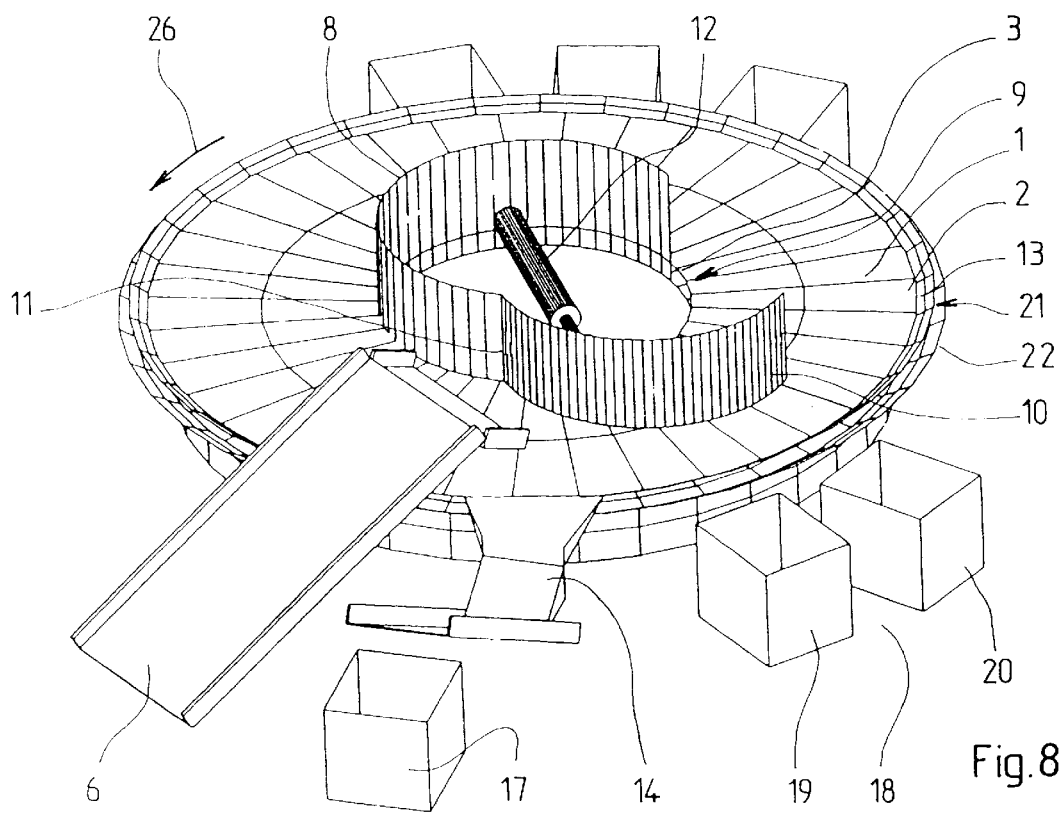
FIG. 8 shows the device from FIG. 7 with the adjustable flap in a partially open position to divert the waste.

In a second embodiment shown in FIGS. 7 and 8, the device of the invention has the same main means of the embodiment from FIGS. 1 through 6, and these means are identified by the same reference numbers.

In particular, it includes the rotary tray 1, delimited by an outside edge 2 and by an inside edge 3, with a generally cylindrical inside wall 8 part of which includes an opening 9 closed off by an adjustable flap 10 pivoting about its vertical edge 11. The ram 12 orients the adjustable flap 10 between a closed position, shown in FIG. 7, a partly open position shown in FIG. 8, and a totally open position similar to that shown in dashed line in FIG. 3.

In this embodiment of FIGS. 7 and 8, the waste infeed and discharge means 14 are at the periphery of the rotary tray 1, and include for example a downwardly inclined chute 14a communicating with the outside edge 2 of the rotary tray 1 through an opening 14b foreseen in the raised fixed peripheral portion 13, and conveying the waste to an elevator belt 14c from the end 16 of which it is tipped into the hopper 17.

The adjustable flap 10 enables selective tipping of the waste into the waste infeed and discharge means 14 at the periphery.

With the adjustable flap 10 fully open, and the rotary tray 1 rotating in the sorting direction 26 shown in FIG. 8, the adjustable flap 10 diverts the waste and tips it at the periphery into the waste infeed and discharge means 14.

In this embodiment, the waste infeed and discharge means 14 may advantageously be under the loading belt 6, in order to reduce the space taken up around the rotary tray 1, so reserving the maximum amount of room for the operatives carrying out the sorting.

Note that, in this embodiment, the rotary tray 1 can be rotated in only one direction 26, since varying the orientation of the adjustable flap 10 is sufficient of itself to assure the two functions of progressive and radial displacement of the waste during sorting, and of tipping of the waste into the waste infeed and discharge means 14.

Furthermore, in accordance with the invention, and in a variant of the embodiment of FIGS. 7 and 8, the central space 4 can be very small or even eliminated, if at the same time other means are provided for supporting and displacing the adjustable flap 10. The adjustable flap 10 can in this case be supported by a central column or by a gantry linking it to the frame 30, for example, and can be displaced in vertical translation and pivot about a vertical axis.

In all the embodiments that have been described, there may additionally be provision for driving the rotary tray 1 at variable speed, the speed being selected to suit the sorting steps, the number of operatives and the type of waste to be selected.

The present invention is not limited to the embodiments that have been explicitly described, but encompasses the various variants and generalisations thereof within the scope of the following claims.

We claim:

1. A device for manually sorting waste, comprising:
    a) a generally annular rotary tray, the tray having a surface, and means for rotating the rotary tray,
    b) the rotary tray defining a central space which contains a wall, the wall being distinct from the rotary tray,
    c) an adjustable flap, connected to the wall, and means for continuously adjusting a position of the flap while the tray is rotating, wherein the flap comprises means for scraping a controllably variable amount of waste from the surface of the tray, and
    d) means for infeed and discharge of waste, disposed near the rotary tray.

2. The device of claim 1, wherein the rotating means comprises means for rotating the tray in either of two mutually opposite directions of rotation.

3. A method of manually sorting waste, comprising:
    a) rotating a generally annular tray, the tray having a surface, the rotary tray defining a central space which contains a wall, the wall being distinct from the rotary tray,
    b) continuously adjusting a flap, connected to the wall, while the tray is rotating, wherein the flap scrapes a controllably variable amount of waste from the surface of the tray, and
    c) feeding waste to the tray, and discharging waste from the tray.

4. The method of claim 3, wherein the tray is rotatable in either of two directions, and wherein the method further comprises selecting a direction in which to rotate the tray.

5. Device for manually sorting waste, comprising at least one operative station (18) at the periphery of a closed loop presentation system, with means (6) for delivering waste to be sorted onto the presentation system, the presentation system being a horizontal and generally annular rotary tray (1), delimited by an outside edge (2) and by an inside edge (3), and rotated about a coaxial vertical axis (I—I) by drive means (5), wherein:
    the inside edge (3) surrounds a central space (4),
    waste infeed and discharge means (14) are disposed near at least one of the inside (3) and outside edges (2),
    adjustable pushing means (10) push the waste on the rotary tray (1) selectively and adjustably in the radial direction at least towards the outside edge (2), to move it selectively towards the outside edge (2) and to make it accessible by the operative occupying the operative station (18),
    the adjustable pushing means (10) selectively push the waste on the rotary tray (1) radially and progressively to at least one of the inside (3) and outside edges (2), and tip it onto the waste infeed and discharge means (14),
    the operative station (18) comprises at least one structure (19, 20, 21) for infeed and discharge of selected waste shaped and disposed for infeed and discharge of waste selected by the operative occupying the operative station (18).

6. Device according to claim 5, wherein the adjustable pushing means (10) comprise at least a first adjustable flap (10), in a fixed area above the rotary tray (1), and adapted to scrape the waste carried by the rotary tray (1) and to divert it radially at least towards the outside edge (2), with means (12) for actuating the first adjustable flap (10) to control its orientation and the resulting diversion of the waste.

7. Device according to claim 6, wherein:

waste infeed and discharge means (14) are disposed at the periphery of the rotary tray (1), the first adjustable flap (10) is adapted selectively to tip the waste into said waste infeed and discharge means (14).

8. Device according to claim 5, wherein the adjustable pushing means (10) comprise at least a second adjustable flap (10) in a fixed area above the rotary tray (1), and adapted to scrape the waste carried by the rotary tray (1) and to divert it radially to the inside edge (3), with means (12) for actuating the second adjustable flap (10) to control its orientation and the resulting diversion of the waste, the second adjustable flap (10) being adapted selectively to tip the waste into waste infeed and discharge means (14) accommodated in the central space (4).

9. Device according to claim 8, wherein the first flap and the second flap comprise one and the same adjustable flap (10).

10. Device according to claim 7, wherein the inside edge (3) is surmounted by a coaxial generally cylindrical inside wall (8) having an opening (9), wherein the adjustable flap comprises means for closing off the opening (9), the adjustable flap (10) being hinged about a vertical rotation axis (II—II) along one of its vertical edges (11), the flap (10) being adjustably orientable in all intermediate positions between a folded position in which it closes off the opening (9) in the interior wall (8) to prevent the waste reaching the central space (4), and a deployed position in which it diverts the waste resting on the rotary tray (1) radially.

11. Device according to claim 10, wherein:

the adjustable flap (10) is curved in the shape of a cylindrical arc, the drive means (5) are adapted selectively to rotate the rotary tray (1) in both rotation directions (26, 27), so that, when the adjustable flap (10) is in the deployed position, rotation of the rotary tray (1) in a first direction (26) diverts the waste towards the outside edge (2) in order to move it towards the operative station (18), and rotation of the rotary tray (1) in the opposite direction (27) diverts the waste towards the opening (9) in the inside wall (8) and advances it into the central space (4) to be discharged.

12. Device according to claim 5, wherein the outside edge (2) of the rotary tray (1) is surrounded by a raised fixed peripheral portion (13), preventing unintentional escape of the waste from the periphery of the rotary tray (1), and constituting a fixed support for the operative to lean on.

13. Device according to claim 5, wherein the structure for infeed and discharge of selected waste comprises at least one bottom peripheral opening (21) linked by an inclined ramp (22) to discharge means for the selected waste.

14. Device according to claim 13, wherein the inclined ramp (22) conveys the selected waste to a coaxial fixed bottom tray (23) associated with a scraper (24) driven by the rotary tray (1) to push the selected waste towards at least one outlet in the fixed bottom tray (23) to discharge it.

15. Method of sorting waste, in which the waste is delivered onto a closed loop presentation system (1) to pass near at least one operative station (18) occupied by an operative responsible for manual sorting, wherein:

the presentation system is a horizontal and generally annular rotary tray (1), in an initial sorting step, the waste on the rotary tray (1) is progressively pushed towards the periphery (2) to move it towards the operative who removes selected waste from the rotary tray (1), during a final step, the waste that has not been selected is pushed either towards the centre (3), or towards the periphery (2) of the rotary tray (1) where it is tipped into waste infeed and discharge means (14).

* * * * *